United States Patent [19]
Miller

[11] Patent Number: 5,951,062
[45] Date of Patent: Sep. 14, 1999

[54] SADDLE-LESS FITTING

[76] Inventor: Daniel A. Miller, 2440 River Rd., St. Clair, Mich. 48079

[21] Appl. No.: 08/864,591

[22] Filed: May 28, 1997

[51] Int. Cl.$^6$ ..................................................... F16L 41/08
[52] U.S. Cl. ....................... 285/189; 285/133.4; 285/179; 285/197; 285/423; 285/906; 285/915; 29/890.14
[58] Field of Search ................................ 285/133.1, 197, 285/915, 138, 189, 133.4, 179, 423, 906; 29/890.14

[56] References Cited

U.S. PATENT DOCUMENTS

| 1,883,439 | 10/1932 | Adams | 285/915 X |
| 3,649,055 | 3/1972 | Nilsen | 285/915 X |
| 5,203,943 | 4/1993 | Nornberg et al. | 285/915 X |

FOREIGN PATENT DOCUMENTS

| 1196230 | 11/1959 | France | 285/138 |
| 1811610 | 6/1970 | Germany | 285/197 |
| 852326 | 10/1960 | United Kingdom | 285/197 |

*Primary Examiner*—Dave W. Arola
*Attorney, Agent, or Firm*—Calfee, Halter & Griswold LLP

[57] ABSTRACT

The present invention provides a saddle-less fitting having a stepped outer wall surface. The stepped outer wall surface includes a first and second surface and a step. The step includes a first bowed band surface extending from the first outer wall surface a predetermined distance inward towards the inner wall surface. The fitting further includes an insertion portion which includes the second outer wall surface and a second bowed band surface. The first bowed band surface and the second surface are bonded to a prepared pipe with a bonding agent. A more liberal application of the bonding agent may be employed to cause the other fitting and pipe surfaces to further bond together. Once the bonding agent hardens, or becomes cured, a unitary structure is formed which provides a leak-free tap.

12 Claims, 4 Drawing Sheets

SADDLE-LESS FITTING

FIELD OF THE INVENTION

The invention relates generally to fitting device for pipes, and more particularly, to saddle-less fitting devices for joining pipes, valves, or other fittings.

BACKGROUND OF THE INVENTION

The use of piping is one of the most important methods of transporting fluids from one location to another location. Water, for example, is transported from a potable water plant to a residential home via a complex network of pipes. Similarly, other fluids such as natural gas and gasoline are transported from one location to another via complex networks of pipes. These complex networks of pipes typically include, inter alia, many branches, elbows, and terminations, all of which are necessary to direct the fluid being transported, often with the fluid under pressure.

As in the case of branches or elbows, it is often necessary connect a second, usually smaller pipe to a first, larger pipe so as to modify the direction or flow of a fluid. For example, it may sometimes be necessary to "tap" into a water main pipe to provide a water supply to a new location (e.g., a new building.)

Originally, when such connections were required, artisans employed saddle fittings. Saddle fittings provide the advantage of allowing a second pipe to be connected to a first pipe by simple forming a hole in the wall of the first pipe instead of having to cut the entire first pipe to make room for a "tee" fitting which would otherwise be used. However, connection of saddle fittings to the pipe or pipes being "tapped" requires preparation of both the saddle surface and the tapped pipe surface for the acceptance of bonding or cementing agents (e.g., primers and glues) in the case of plastic pipes and fittings. Depending on the size of the saddle, the time for this preparation may be quite extensive. Similarly, the amount of cementing agents required to cement or bond the saddle fitting to the pipe being "tapped" may also be quite large. When the time and material required for one such "tap" is compounded by all such "taps" required for a particular project, the time and materials involved can be quite significant. Moreover, such "saddle taps" mount the fittings only on the surface of the main pipe and thus rely solely on the shear strength of the bonding or cementing agents which results often in connections that can be easily sheared off. Accordingly, a fitting which does not suffer from the above mentioned disadvantages is desired.

SUMMARY OF THE INVENTION

According to one aspect of the present invention, a fitting is provided for allowing fluid communication between a pipe and at least one piping device. A piping device includes any pipe, valve, or fitting which is to be attached to a pipe. The fitting includes a fitting outer wall surface; a fitting stepped inner wall surface for defining a first and second passage; a first bowed band surface extending from the fitting outer wall a predetermined distance inward towards the stepped inner wall surface and for physically communicating the fitting with the pipe; and an insertion portion in physical communication with the bowed band surface and for inserting into the pipe.

The first passage includes a first surface and the second passage includes a second surface. The insertion portion includes a portion of the second passage and an insertion outer wall surface in physical communication with the first bowed band surface.

It is therefore an advantage of the present invention to provide a fitting which does not require a saddle for attachment to a pipe.

It is a further advantage of this invention to provide a fitting which requires less material and labor than traditional saddle fittings for tapping into a pipe.

It is still further an advantage of the present invention to allow easy fabrication of saddle-less fitting from a plurality of materials.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

Figure 1:
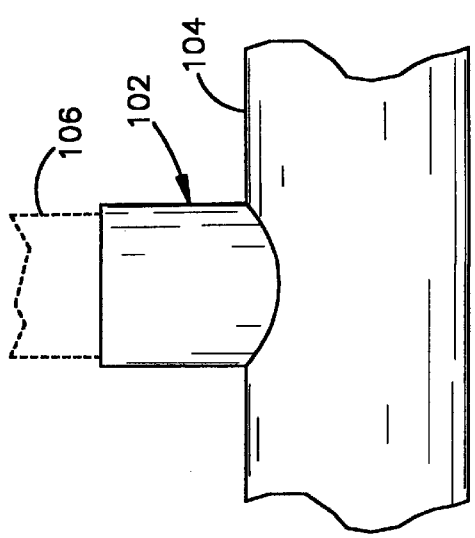
FIG. 1 is an elevational view of the fitting of the present invention tapped into a pipe.
Figure 2:
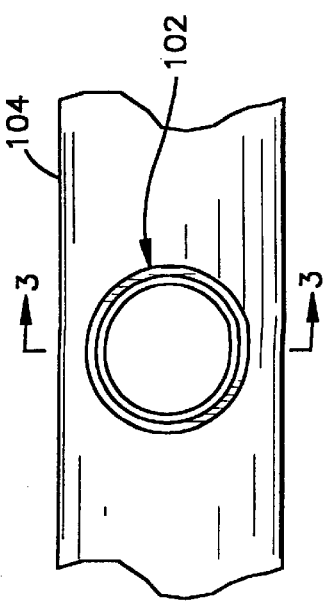
FIG. 2 is a plan view of the fitting and pipe of FIG. 1.

Referring now to the drawings and for the present to FIGS. 1 and 2, elevational and plan views of a fitting 102 of the present invention connected to a pipe 104 for providing a "tap" is shown. The fitting 102 is shown creating a perpendicular "tap" into pipe 104. A second pipe 106 may be attached to the fitting 104 to provide fluid communication between pipe 104 and the second pipe. It should be noted that other fittings such as ELLs or TEEs, in addition to pipes, may be attached to the fitting 104 to provide any required tap and/or fluid directional modification.

Figure 3:
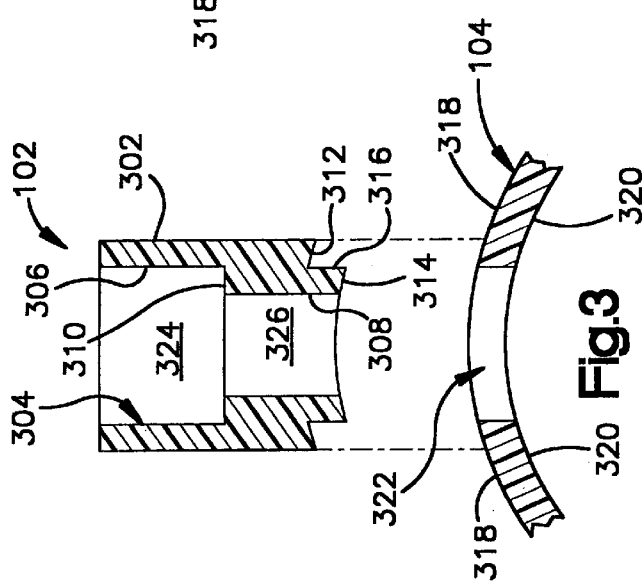
FIG. 3 is an exploded sectional view taken along section lines 3—3 of FIG. 2.

Referring now to FIG. 3, an exploded sectional view taken along section lines 3—3 of FIG. 2 is shown. The fitting 102 includes an outer wall surface 302, a stepped inner wall 304, and first and second bowed band surfaces 312 and 314. The fitting 102 also includes an insertion portion defined by an insertion outer wall surface 316, the second bowed band surface 314, and a portion of the stepped inner wall 304. The outer wall surface 316 is preferably generally cylindrical, but may also be tapered if desired.

The stepped inner wall 304 includes wall surfaces 306, 308, and 310. Outer wall surface 302 and stepped inner wall surface 306 are preferably tapered cylindrical surfaces so as to form a frictional grip on an inserted pipe. However, they may also be purely cylindrical surfaces. Stepped inner wall surface 308 is preferably generally a cylindrical surface, but may be tapered if desired. A first passage 324 is defined by surfaces 306 and 310 of the stepped inner wall surface 304 and forms a "socket." A second passage 326, in communication with the first passage, is defined by surface 308 of stepped inner wall surface 304. Stepped inner wall surface 310 is preferably a flat circular band surface which restricts the depth of entry of the inserted pipe. In other embodiments, outer wall surface 302 and stepped inner wall surface 304 may be threaded to provide secure connection to a pipe, valve, or other fitting to be attached.

A tap is created in pipe 104 by creating an opening or aperture 322 in the wall of pipe 104 which is large enough to accept insertion of the fitting 102 insertion portion. More specifically, the opening 322 is preferably large enough so that cylindrical surface 316 of the fitting 104 may be inserted. Bowed band surface 312 is preferably formed with a curvature equal to the curvature of pipe outer wall surface 318 and extends from the fitting outer wall 302 a predetermined distance inward towards the stepped inner wall surface 304. Bowed band surface 314 is preferably formed with a curvature equal to the curvature of pipe inner wall surface 320 and extends from insertion portion outer wall surface 316 to stepped inner wall surface 308. It should be noted that bowed band surfaces 312 and 314 appear as circular band surfaces in plan view (not shown) and if flattened after bowing, would appear as elliptical band surfaces. It should be further noted that bowed band surface 314 may also be a flat circular band surface, that is, unbowed in other embodiments.

Figure 4A:
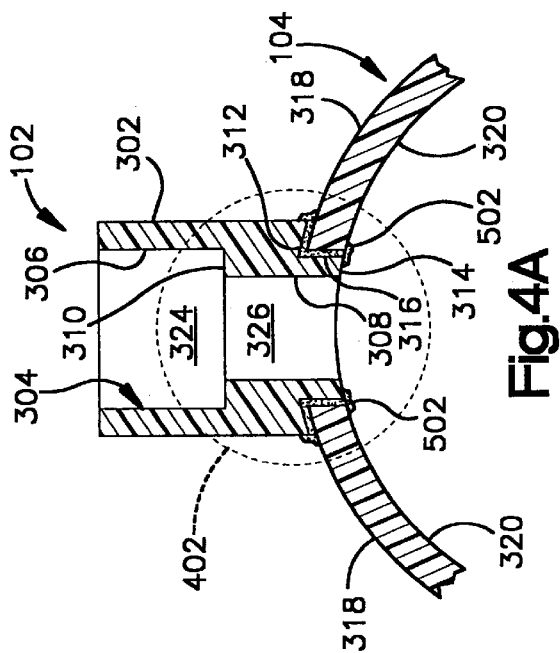
FIG. 4A is an unexploded view of FIG. 3.
Figure 4B:
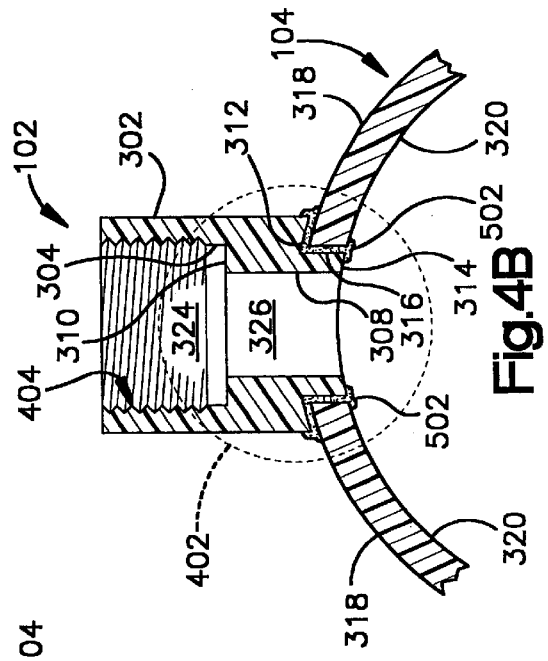
FIG. 4B is an sectional view the fitting of FIG. 4A having threads.

Referring now to FIG. 4A, the exploded sectional view of FIG. 3 is shown unexploded. The fitting 102 is shown inserted into opening 322 (shown in FIG. 3). As will be described in more detail hereinafter, the fitting may be bonded or cemented with the pipe 104 via bonding or cement agent 502. The outer wall surface 316 is preferably dimensioned so as to be at least as long as the wall thickness of pipe 104 so as to provide a suitable bonding or cementing (hereinafter collectively referred to as "bonding") surface area with the inner wall of the opening 322. Also, bowed band surface 312 is dimensioned so as to have a suitable bonding surface area with pipe outer wall 318. Illustrated in FIG. 4B is the fitting 102 of FIG. 4A with internal threads on the stepped inner wall surface 304.

Figure 5:
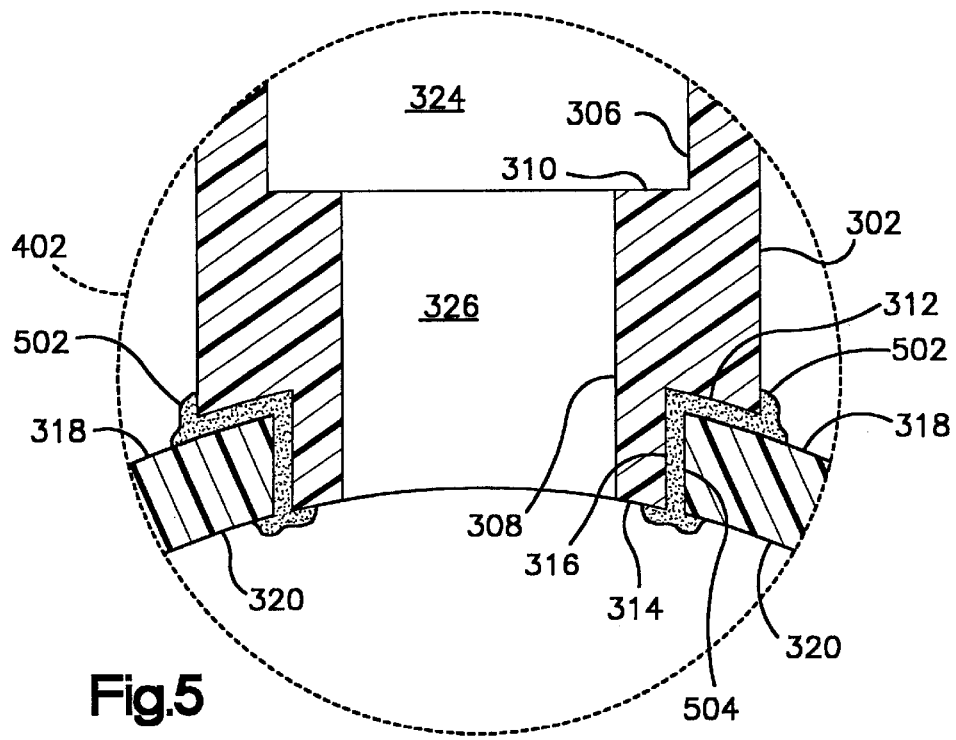
FIG. 5 is a magnified view of a portion of FIG. 4A.

Illustrated in FIG. 5 is a magnified view of area 402 of FIG. 4A showing bonding agent 502. Bonding agent 502 is applied to fitting surfaces 312 and 316 and to pipe surfaces 318 and 504. These surfaces are then placed in physical communication as shown in FIGS. 4A and 5 thereby forming bonding areas which are allowed to harden or cure. When bonding agent 502 hardens or becomes cured, a secure, leak-free tap is provided. The bonding agents 502 and the applied surfaces form a unitary seal which prevents the leaking of fluids. The fitting may now accept a pipe, valve, or other fittings. It should also be noted that a more liberal application of bonding agents 502 may include applying the bonding agents to surfaces 302, 314, 318, and 320 to further secure the connection. The bonding may be by any conventional bonding or cementing method.

The fitting 102 is preferably formed from injection-molded plastic such as PVC or CPVC and is pre-formed based on the diameter and wall thickness of the pipe to be tapped and the diameter of the pipe, valve, or fitting to be coupled to the fitting of the present invention. As mentioned, the pipe, valve, or fitting may be coupled to the fitting of the present invention via threads or bonding. Additionally, the fitting of the present invention may be made of metal, fiberglass, or plastic materials if desired. The preferred embodiment employs the combination of PVC or CPVC bonding cement as a bonding agent.

Figures 6, 7:
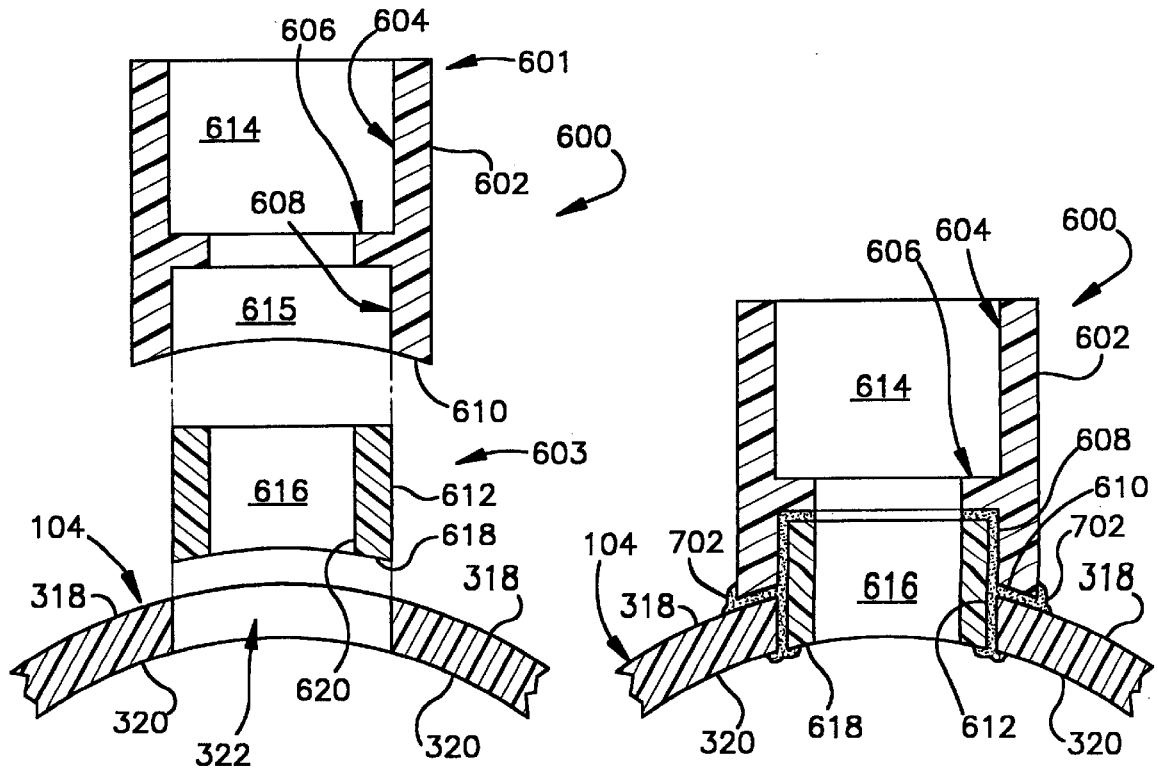
FIG. 6 is an exploded cross-sectional view of a another embodiment of a fitting having a plurality of portions according to the present invention.
FIG. 7 is an unexploded view of the fitting of FIG. 6 secured to a pipe.

An alternative embodiment of the present invention is illustrated in FIGS. 6 and 7. More specifically, FIG. 6 shows an exploded view of a fitting device 600 and FIG. 7 shows an assembled view of the fitting device. Referring now particularly to FIG. 6, the fitting 600 includes a first portion 601 and second portion 603. The first portion 601 includes outer surface 602, inner surfaces 604 and 608, an integrated annulus member 606, and a bowed band surface 610. The outer surface 602 and inner surface 608 are preferably generally cylindrical. The inner surface 604 is preferably a tapered cylindrical surface and, along with annulus member 606, forms first passage 614. A second passage 615 is formed by annulus member 606 and inner surface 608. The annulus member 606 is integral into the inner space of the first portion 601 and is disposed in a predetermined location between inner surfaces 604 and 608. The location is a function of design but in any event must allow for proper attachment of other piping devices in passage 614 and second portion 602 in passage 615.

The second portion 603 includes inner surface 620, outer surface 612 and bowed surface 618. The inner surface 620 defines a third passage 616 and is preferably generally cylindrical. The outer surface 612 is also preferably generally cylindrical and sized so as to closely fit within aperture 322 of pipe 104. The second portion 602 is inserted and bonded into second passage 615.

Referring now to FIG. 7, fitting 600 is shown assembled and bonded to pipe 104. The second portion 603 is secured within the second passage 615 with a bonding agent 702. The fitting, so formed, is then secured to the pipe 104 via further application of the bonding agent 702 as shown in FIG. 7. Once hardened, the bonding agent forms a unitary structure with the pipe 104 and fitting 600 so to provide a leak-free tap.

Figure 8:
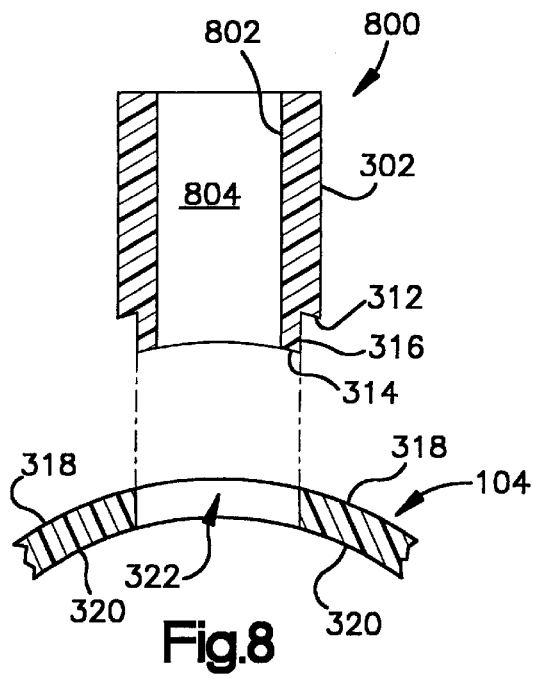
FIG. 8 is an exploded view of another embodiment of the present invention in the form of a fitting having a single inner passage.
Figure 9:
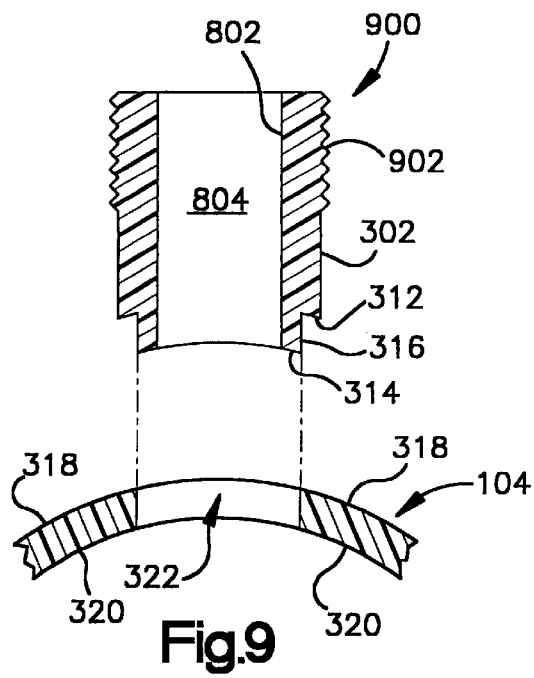
FIG. 9 is an exploded view of the fitting of FIG. 8 with threads.

Illustrated in FIG. 8 is another embodiment of a fitting according to the present invention. The fitting 800 is similar to the fitting 102 of FIGS. 3 and 4 except that it includes an inner surface 802 which defines passage 804. The inner surface 802 is preferably generally cylindrical and by also be tapered. The fitting 800 is bonded to the pipe 104 as previously described. Shown in FIG. 9 is the embodiment of FIG. 8 with threads shown as part of outer surface 302.

Figure 10:
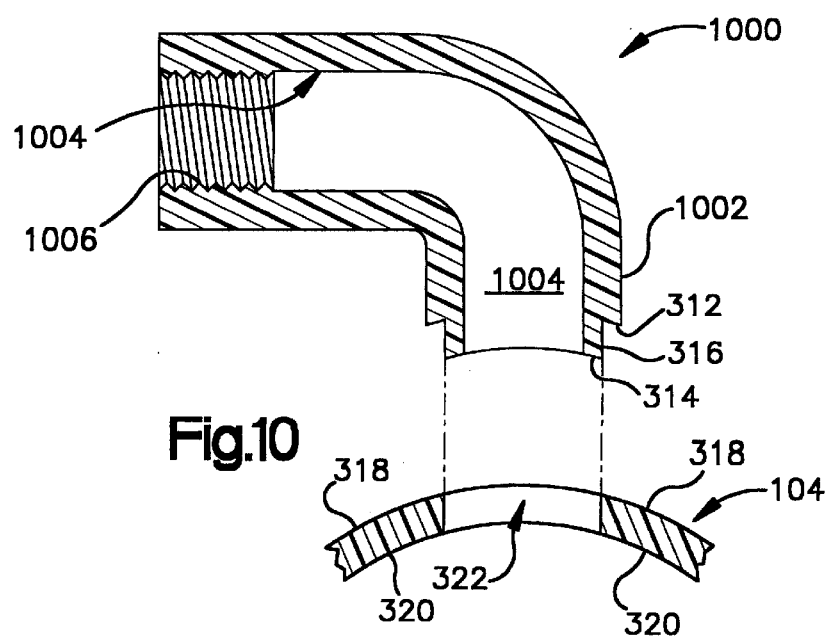
FIG. 10 is an exploded view of another embodiment of the present invention in the form of an ELL fitting with threads.

Referring now to FIG. 10, yet another embodiment of a fitting according to the present invention is shown. The fitting 1000 is similar to the fittings described previously except that it is in the configuration of a 90° ELL fitting. Specifically, the fitting 1000 includes angled outer surface 1002 and angled inner surface 1004. These surfaces are preferably generally cylindrical and may be additionally tapered. The fitting 1000 also includes threads on inner surface 1004 to facilitate attachment to other piping devices. The fitting 1000 is secured to the pipe 104 in the manner described earlier. It should be further understood that other angled ELLs may also be employed, such as 45° ELLs.

Figure 11:
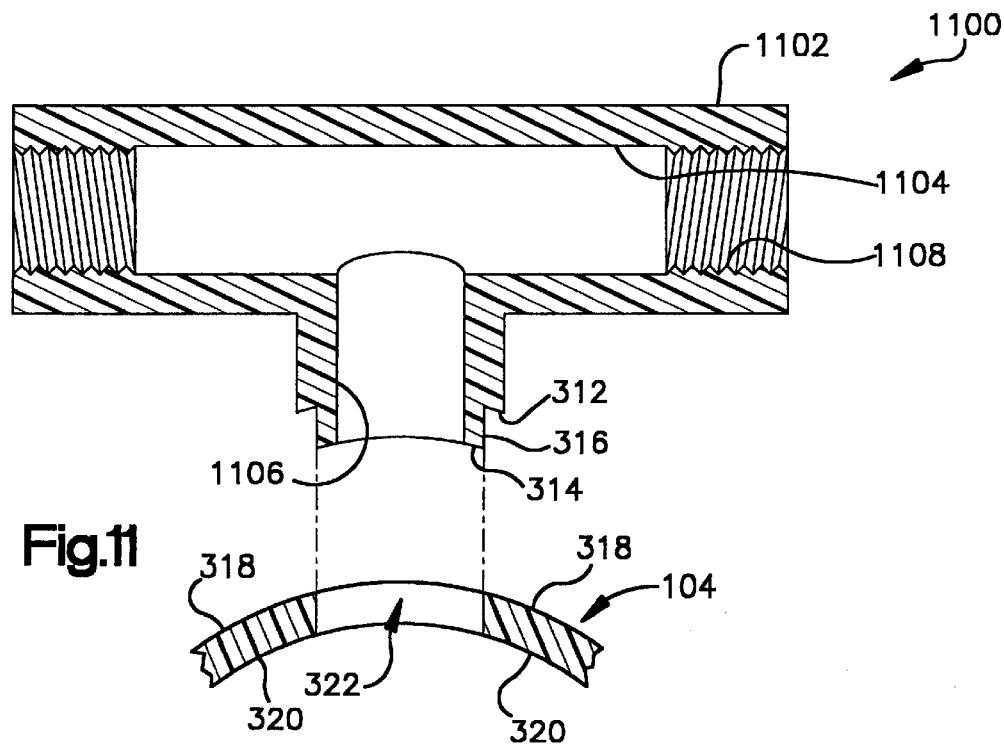
FIG. 11 is an exploded view of another embodiment of the present invention in the form of a TEE fitting with threads.

Referring now to FIG. 11, another embodiment of a fitting according to the present invention is shown. The fitting 1100 is similar to the fittings described previously except that it is in the configuration of a TEE fitting. More particularly, the fitting 1100 includes outer surface 1102 and inner surfaces 1004 and 1006. These surfaces are preferably generally cylindrical and may additionally be tapered. The fitting 1100 also includes threads on inner surface 1004 to facilitate attachment to other piping devices. The fitting 1100 is secured to the pipe 104 in the manner described earlier.

Figure 12:
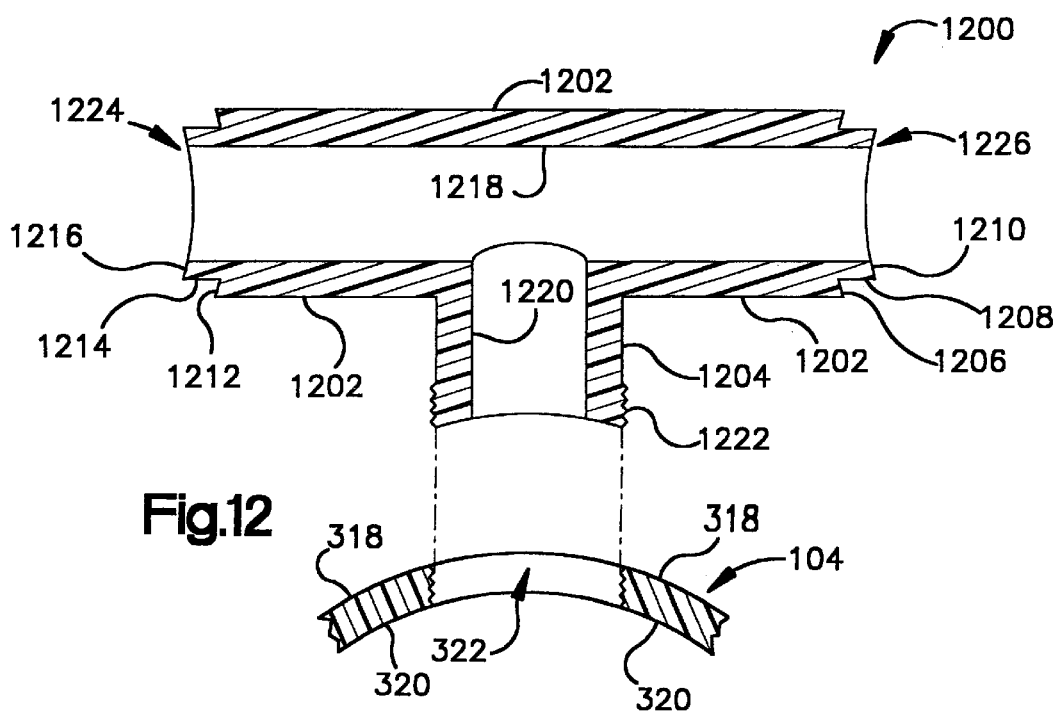
FIG. 12 is an exploded view of a TEE fitting having first and second run ends according to the present invention.

Referring now to FIG. 12, an embodiment of a fitting according to the present invention is shown in the form of a TEE fitting 1200. The fitting 1200 includes a run portion having a first and a second end portion 1226 and 1224. The first end portion 1226 includes a first run surface 1202, a step 1206, and a second run surface 1208. The second end portion 1224 includes the first run surface 1202, a step 1212 and a third run surface 1214. Each end portion also includes a band surface 1210 and 1216 and an insertion portion. The insertion portion of first end 1226 includes second run surface 1208 and band surface 1210. The insertion portion of the second end 1224 includes third surface 1214 and band surface 1216. Surfaces 1206 and 1212, 1208 and 1214, and 1210 and 1216 possess the same characteristics and are formed in the same manner as surfaces 312, 316 and 314. The fitting 1200 further includes a bull-head portion having an inner surface 1220 and an outer surface 1204 with threads 1222. The inner surfaces 1218 and 1220 and the outer surfaces 1202 and 1204 are preferably generally cylindrical. The first and second end portions 1226 and 1224 are secured to desired piping devices in a manner that is identical to the securing of fitting 102 to pipe 104 of FIGS. 4A and 5. It should be noted that the first and second end portions 1226 and 1224 are preferably dimensionally identical. However, they may also be dimensionally diverse. For example, one end may be larger than the other, or one or both ends may include tapered surfaces.

While the present invention has been illustrated by the description of embodiments thereof, and while the embodiments have been described in considerable detail, it is not the intention of the application to restrict or in any way limit the scope of the appended claims to such detail. Additional advantages and modifications will readily appear to those skilled in the art. For example, male or female threads may be employed in the fitting 102 for attachment to pipes, valves, or other fittings and passages and surfaces may be tapered or not tapered. Additionally, the present invention may be applied to plugs, unions, male and female adapters, flanges, 30° ELLS, crosses, WYES and reducing fittings. Furthermore, sockets may be employed instead of threads and vice-versa. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A fitting device for providing fluid communication between a pipe having an inner and outer curvature and at least one piping device, the fitting device comprising:

(a) an inner wall for defining a passage;
    (b) a saddle-less outer wall having:
        (1) a first cylindrical outer wall comprising:
            (i) a first terminating edge and a second terminating edge; and
            (ii) a first cylindrical outer wall radius; and
        (2) a second cylindrical outer wall comprising:
            (i) a first terminating edge and a second terminating edge; and
            (ii) a second cylindrical outer wall radius which is less than the first cylindrical outer wall radius; and
        (3) a first bowed band surface between the first and second cylindrical outer walls and extending from the first terminating edge of the first cylindrical outer wall a predetermined distance inward towards the first terminating edge of the second cylindrical outer wall and for physically communicating the fitting with the pipe, and wherein the first bowed band surface has a curvature which is complementary to the outer curvature of the pipe; and
    (c) a flat band surface extending from the inner wall to the second terminating edge of the first cylindrical outer wall.

2. The fitting device of claim 1 wherein the length of the second cylindrical outer wall is at least equal to the pipe's wall thickness.

3. The fitting device of claim 1 wherein the inner wall comprises a wall portion having threads formed thereon.

4. The fitting device of claim 1 wherein the first cylindrical outer wall comprises a wall portion having threads formed thereon.

5. The fitting device of claim 1 wherein the inner wall is tapered.

6. A fitting device for providing fluid communication between a pipe having an inner and outer curvature and at least one piping device, the fitting device comprising:

(a) an inner wall for defining a passage;
    (b) a saddle-less outer wall having:
        (1) a first cylindrical outer wall comprising:
            (i) a first terminating edge and a second terminating edge; and
            (ii) a first cylindrical outer wall radius; and
        (2) a second cylindrical outer wall comprising:
            (i) a first terminating edge and a second terminating edge; and
            (ii) a second cylindrical outer wall radius which is less than the first cylindrical outer wall radius; and
        (3) a first bowed band surface between the first and second cylindrical outer walls and extending from the first terminating edge of the first cylindrical outer wall a predetermined distance inward towards the first terminating edge of the second cylindrical outer wall and for physically communicating the fitting with the pipe, and wherein the first bowed band surface has a curvature which is complementary to the outer curvature of the pipe;
    (c) a flat band surface extending from the inner wall to the second terminating edge of the first cylindrical outer wall; and
    (d) a second bowed band surface which extends from the second terminating edge of the second cylindrical outer wall inward towards the inner wall and has a curvature which is complementary to the inner curvature of the pipe.

7. The fitting device of claim 6 wherein the length of the second cylindrical outer wall is at least equal to the pipe's wall thickness.

8. The fitting device of claim 6 wherein the inner wall comprises a wall portion having threads formed thereon.

9. A method for forming a saddle-less fitting comprising the steps of:

(a) forming an inner wall for defining a passage;
    (b) forming a saddle-less outer wall having, wherein this step for forming comprises the steps of:
        (1) forming a first cylindrical outer wall comprising:
            (i) a first terminating edge and a second terminating edge; and (ii) a first cylindrical outer wall radius; and
(2) forming a second cylindrical outer wall comprising:
   (i) a first terminating edge and a second terminating edge; and
   (ii) a second cylindrical outer wall radius which is less than the first cylindrical outer wall radius; and
(3) forming a first bowed band surface between the first and second cylindrical outer walls and which extends from the first terminating edge of the first cylindrical outer wall a predetermined distance inward towards the first terminating edge of the second cylindrical outer wall and wherein the first bowed band surface has a curvature which is complementary to the outer curvature of the pipe; and (c) forming a flat band surface which extends from the inner wall to the second terminating edge of the first cylindrical outer wall.

10. The method of claim 9 further comprising the step of forming threads on a portion of the inner wall.

11. The method of claim 9 further comprising the step of forming threads on a portion of the first cylindrical outer wall.

12. The method of claim 9 further comprising the step of forming a tapered portion on the inner wall.

* * * * *